March 19, 1929.  W. M. BRADSHAW ET AL  1,705,711
ELECTRICAL MEASURING INSTRUMENT
Filed April 29, 1927
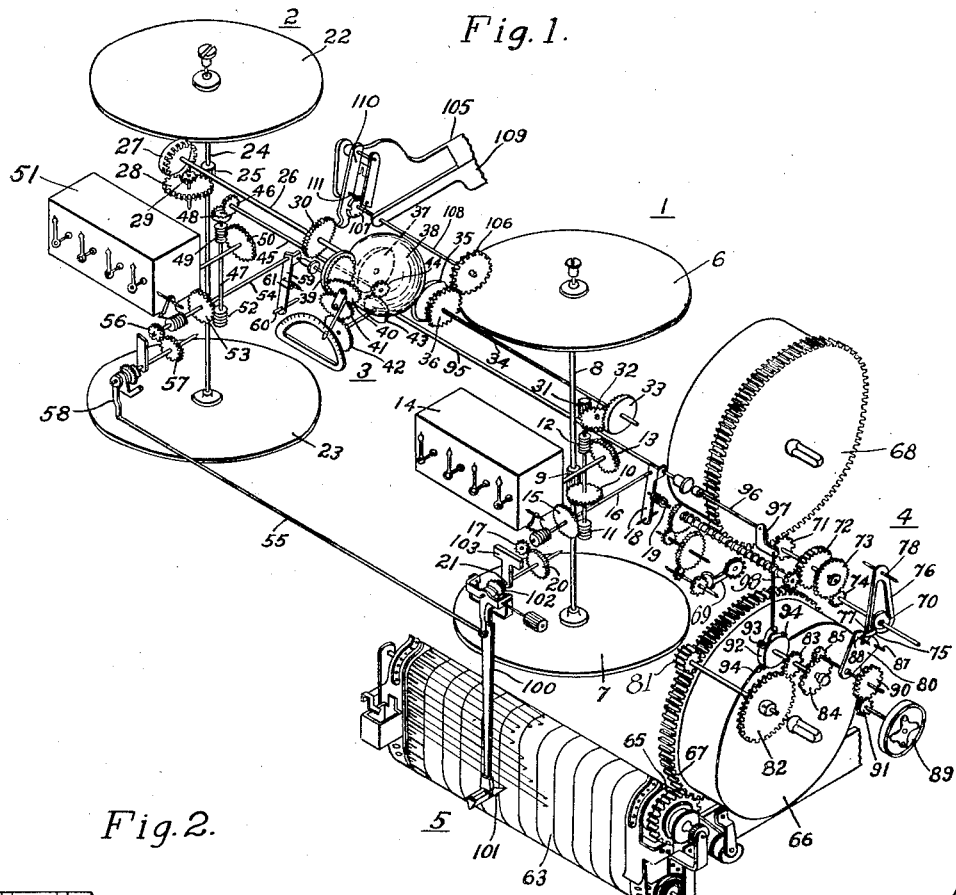
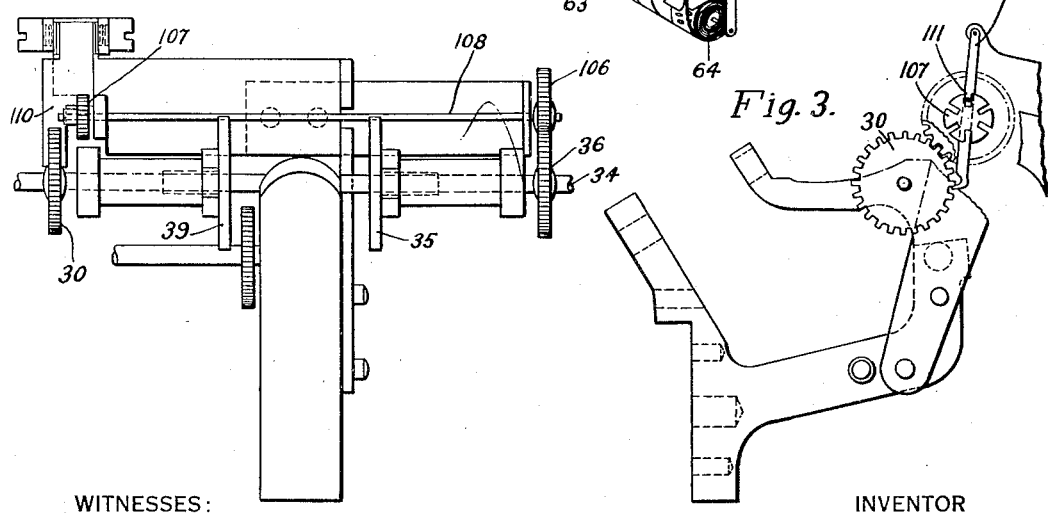
WITNESSES:
C. J. Weller.
B. R. King
INVENTOR
William M. Bradshaw and
Carl Oman.
BY Wesley T. Carr
ATTORNEY Patented Mar. 19, 1929.

1,705,711

UNITED STATES PATENT OFFICE.

WILLIAM M. BRADSHAW, OF WILKINSBURG, AND CARL OMAN, OF SWISSVALE, PENN-SYLVANIA, ASSIGNORS TO WESTINGHOUSE ELECTRIC AND MANUFACTURING COM-PANY, A CORPORATION OF PENNSYLVANIA.

ELECTRICAL MEASURING INSTRUMENT.

Application filed April 29, 1927. Serial No. 187,441.

Our invention relates to electrical measuring instruments and more particularly to instruments for measuring a plurality of alternating current circuit quantities.

The object of our invention is to provide means for suspending operation of an electrical measuring instrument upon a reversal of power flow therethrough.

Our invention is particularly illustrated with reference to a kilovolt-ampere-hour-meter operating on the principle disclosed by F. R. Innes, in Patent No. 1,256,234 issued February 12, 1918.

It is highly desirable that the registration of the meter shall be discontinued when the power is flowing in a reversed direction. If no discontinuing means is provided in the instrument, the watthour element runs backwards, when power is reversed, while the reactive watthour element may run either forward or backward, but, in either case, an indication will be recorded on the chart as if the power were traversing the circuit in a normal direction. An inaccurate indication is, therefore, recorded, and an operator reading the instrument is misled thereby.

In practicing our invention, we provide means for preventing operation in both the watthour element and the reactive kilovolt-ampere-hour element, so long as the current flows in a reversed direction. We mount a mechanical ratchet actuated by the watthour element in cooperative relation with both the watthour element and the reactive element, so that, when the watthour element runs in a reversed direction of rotation, the ratchet operates to stop both the reactive element and the watthour element. However, when power again runs in a normal direction, the ratchet is adapted to release the watthour element and the reactive element, and the measuring instrument is free to operate normally.

In the devices of the prior art, the reactive watthour element, when the flow of power is in the normal direction, rotates in one direction with a lagging power factor and in reverse direction with a leading power factor. Should the flow of power be reversed, the reactive element would rotate in said reverse direction with a lagging power factor and in said one direction with a leading power factor. In accordance with our invention, however, rotation of the reactive watthour element in either direction is prevented upon reversal of power. Ordinarily, this action is effected by the watthour element which, when the power is reversed, moves to some extent in a direction the reverse of its normal direction to operate suitable mechanism and positively prevent rotation of the reactive watthour element in either direction.

Our invention may be more easily comprehended if the following description is considered in connection with the accompanying drawings, of which, Figure 1 is an isometric view of a portion of an electrical measuring instrument constructed in accordance with our invention, Fig. 2 is a view, in elevation, of a ratchet mechanism embodied in our invention, and Fig. 3 is a view, in side elevation, of the ratchet mechanism shown in Fig. 2.

In Fig. 1, a kilovolt-ampere-recording-demand-watthour meter comprises a polyphase watthour element 1, a polyphase reactive watthour-element 2, suitable integrating mechanisms 3, timing mechanisms 4, and a recording device 5. The elements 1 and 2 are actuated by the usual electromagnets, which are omitted from the illustration for purposes of clearness.

The watthour element 1 comprises a disc 6 and a disc 7 suitably mounted on a spindle shaft 8 upon which is also mounted a pinion 9 the motion of which is transmitted to a gear wheel 10. On the same shaft with the gear wheel 10 are mounted a worm gear 11 and a worm gear 12. The worm gear 12 actuates a gear wheel 13 that is suitably connected to a register 14. The worm gear 11 meshes with a gear wheel 15 that is mounted on a shaft 16, that is provided with a gear wheel 17 at one extremity and an arm 18 at the other extremity. Motion transmitted to the gear wheel 15 is adapted to be prevented by a movement of the arm 18 that is restrained by a spring 19. A gear wheel 20 is adapted to be driven by the gear wheel 17 to thereby transmit motion to a kilowatt-recording shaft 21.

The reactive-volt-ampere-hour element 2 is provided with a disc 22 and a disc 23 mounted on a shaft 24. The reactive-watthour element 2, that will be referred to hereinafter as the reactive element, consists of a standard polyphase watthour meter having voltage elements connected through special potential transformers (not shown), so that, at unity power-factor, the voltage applied to the meter element lags the current by 90 degrees.

A wheel 25 is mounted on the shaft 24 to drive a shaft 26 through a crown gear 27, a gear wheel 28, and a gear wheel 29. A gear wheel 30 is mounted on the shaft 26 for purposes that will be explained hereinafter.

Returning to the watthour-meter element 1, rotation of the shaft 8 is transmitted, through the gear train, to a pinion 31 that is mounted on the same shaft as the worm wheels 11 and 12. A gear wheel 32 meshes with the pinion 31 to drive a crown gear 33 that is mounted on a shaft 34. Mounted on the shaft 34 is a disc wheel 35 and a gear wheel 36.

The disc wheel 35 and the gear wheel 36 have rotation governed by the rotation of the discs 6 and 7 of the watthour-meter element 1.

The disc wheel 37 is mounted on the shaft 26 of the reactive-watthour meter 2 to have a forward or a backward rotation that is governed by the rotation of the discs 22 and 23 of the reactive-watthour meter 2.

The integrating mechanism 3 comprises a spherical ball 38 mounted on the disc wheels 35 and 37 to rest against a support in the form of a disc wheel 39. Gear wheel 39, in addition to supporting the ball 38, is driven by it and, in turn, drives gear wheels 40, 41, 42 and 43, which latter gear wheel 43 drives a gear 44 that is mounted on a shaft 45. A gear wheel 46 is mounted on the shaft 45 to drive a shaft 47 through a gear 48 mounted thereon. A worm wheel 49 is mounted on the shaft 47 to drive a gear wheel 50 that is suitably connected to drive a registering mechanism 51.

Another worm wheel 52 is mounted on the shaft 47 to drive a gear wheel 53 that is mounted on a shaft 54. Rotation of the shaft 54 is transmitted to a member 55 through a gear wheel 56, a gear wheel 57 and an arm 58.

The gear wheel 53 is demeshed from the worm wheel 52 when an arm 59 mounted on a shaft 54 is moved about its pivot 60 against the resilient force of a spring 61.

The integrating mechanism 3 is constructed similar to, and operates in accordance with, a mechanism for integrating power current values invented by F. R. Innes, and set forth in U. S. Patent 1,256,234 issued February 12, 1918. The disc wheel 37 rotates in accordance with reactive-watts, the disc wheel 35 rotates in accordance with watts and the disc wheel 39 rotates in accordance with volt amperes.

The registering mechanism 51 is calibrated to show volt-ampere-hours, and the registering mechanism 14 is calibrated to show watthours.

The recording mechanism 5 comprises a chart 63 adapted to be unwound from a roller 64 and wound on a roller 65 by means of a spring-drive device 66 geared to a gear wheel 67 mounted on the roller 65.

The clock mechanism 4 is adapted to perform two functions, first, to drive the chart 63, and second, to give a time interval to the indicating-recording device. A clock spring 68 runs continuously at a speed regulated by an escapement device 69, such as is used in any timekeeping device. The clock spring 68 actuates continuously an eccentric 70 through gear wheels 71, 72, 73 and 74. The eccentric 70 is provided with a projection 75 and rotates within a sleeve 76. The sleeve 76 is provided with a projection 77 and swings on an axis 78.

The clock mechanism 66 drives a sector 80 through gear wheels 81, 82, 83, 84 and 85. The sector 80 is provided with two projections 87 and 88 that cooperate with the projections 75 and 77 of the eccentric 70 and the swinging sleeve 76, respectively, to limit the action of the clock spring 66.

The speed of the clock spring 66 is regulated by a governor 89 suitably connected to gear wheel 85 through gear wheels 90 and 91.

The clock spring 66 drives a disc wheel 92 through gears 81, 82 and 83. The wheel 92 is provided with high projections 93 and relatively low projections 94, whereby, upon rotation of the wheel 92, the clock wheel 53 is disconnected from the worm wheel 52 by virtue of the high projections 93, through a rod 95, a rod 96, a bell crank 97 and a rod 98; and the gear wheel 15 is disconnected from the worm wheel 11 by virtue of the action of the low projection 94, through a rod 96, a bell crank 97 and a rod 98.

A stylus 100 is provided with a pen 101 and is driven over the face of the chart 63 under the force imparted to the rod 55 from the gear wheel 39 that rotates in accordance with volt-ampere hours, as has been clearly set forth above. The time interval, in which the stylus 100 is allowed to move is controlled by the action of the eccentric 70 which controls the tripping wheel 92 through cooperation of the projection 75 with the projection 87 of the sector.

A record is also made of the maximum watts traversing the system for any given time interval, by means of a stop 102 mounted on the recording shaft 21 of the watthour meter element. Since the maximum volt amperes will always be greater than the watts or, at least, equal to the watts, for any given time interval; the stylus 100 is allowed to move freely to the right under the action of the rod 55, but, when the force of the rod 55 is removed, the stylus drops back to the stop 102 momentarily and then drops back to its initial position under the action of a weight 103 after the gear wheel 15 is demeshed from the worm wheel 11 by the tripping device.

The ratchet device 105 comprises a gear wheel 106 and a ratchet wheel 107 mounted on a shaft 108 that is held in a supporting base 109. A ratchet arm 110 is mounted above the ratchet wheel 107 and is provided with a pin 111 that engages slots in the ratchet wheel 107 when the latter turns in a direction opposite to normal, or, as is shown in the illustration, in a counter-clockwise direction. An arm 110 is provided also with a projection to engage the gear wheel 30 and stop rotation thereof when the pin 111 engages the slots of the ratchet wheel 107. The ratchet wheel 107 is driven through the shaft 108 by the gear wheel 106 that is, in turn, driven by, and geared to, a gear wheel 36.

The ratchet device 105 operates to prevent rotation of not only the watthour element but also the reactive-watthour element and the volt-ampere hour element upon a reversal of the direction of rotation of the watthour element. A reversal in direction of the watthour element is caused by a reversal in direction of the power traversing the circuit to which the instrument is in electrical connection. When the normal direction of power flow in the circuit is resumed, the shaft 8 turns in a normal direction, and the ratchet device operates to disconnect the arm 110 from the gear wheel 30 that limits the motion of the reactive-watthour element.

So long as the watthour element 1 operates in a normal direction, the reactive element 2 may operate in either direction of rotation, but, upon a reversal of power, the watthour element 1 reverses, and the ratchet device operates to stop not only the watthour element 1 but also the reactive element 2, and all operations except that of the timing mechanisms thereby cease.

A record of a reversal in power is shown on the chart by virtue of the fact that the stylus 100 will be tripped back to an initial position and the chart 63 will advance without interruption, leaving a blank space on the paper that serves as an indication that power was reversed for a definite period.

While we have shown a specific application of our device we do not wish to be so limited. We have endeavored to include all modifications that may be made in the embodiment and application of our device within the scope of the appended claims.

We claim as our invention:

1. A kilovolt-ampere-recording-demand-watthour meter comprising an element actuable in accordance with watts, an element actuable in accordance with the product of reactive volts by amperes traversing a circuit and means for locking the two mentioned elements upon the backward motion of the watt element comprising a ratchet adapted to engage a gear wheel mounted on the reactive element and stop rotation therein.

2. A ratchet mechanism for a volt-ampere-watthour-demand-meter comprising a ratchet actuated by the watthour element to stop rotation of both the reactive element and the watthour element upon reversal of the watthour element.

3. An electrical measuring instrument comprising a plurality of actuable elements mounted on separate turning members and a ratchet to limit motion of all of the elements on a reversal of rotation of one of the elements.

4. An electrical measuring instrument comprising a ratchet device in cooperative relation with a plurality of actuable elements mounted on separate turning members, the said ratchet device serving to stop the operation of the elements upon a predetermined direction of rotation of one of the said elements.

5. An electrical measuring instrument comprising a volt-ampere element and a watthour element, and a mechanical ratchet actuated by the watthour element, whereby, upon a reversal of the watthour element, the ratchet engages and stops rotation of the volt-ampere element and the backward rotation of the watthour element.

6. An electrical measuring instrument for indicating the power and the product of pressure by quantity traversing an electrical circuit, comprising a ratchet in cooperative relation to rotatable elements of the indicating means, to stop rotation of the elements when the power in the circuit reverses.

7. The combination with a reactive watthour element, of means for rotating said element in accordance with the characteristics of the electrical power traversing a circuit in normal direction, a watthour element rotatable in one direction when the power flow is in normal direction and in reverse direction when the power flow is in reverse direction, and mechanism responsive to movement of said watthour element in reverse direction for restraining movement of said reactive watthour element.

8. The combination with a reactive watthour element, of means for rotating said element in accordance with characteristics of the electrical power traversing a circuit in normal direction, a watthour element rotatable in one direction when the power flow is in normal direction and in reverse direction when the power flow is in reverse direction, and mechanism responsive to movement of said watthour element in reverse direction for restraining movement of said reactive element and said watthour element.

9. The combination with a reactive watthour element, of means for rotating said element in accordance with the characteristics of the electrical power traversing a circuit in normal direction, a watthour element rotatable in one direction when the power flow is in normal direction and in reverse direction when the power flow is in reverse direction, and mechanism responsive to movement of said watthour element in reverse direction for restraining movement of said watthour element.

In testimony whereof, we have hereunto subscribed our names this 25th day of April, 1927.

WILLIAM M. BRADSHAW.
CARL OMAN.